United States Patent Office 3,480,694
Patented Nov. 25, 1969

3,480,694
STABILIZATION OF POLYOXYMETHYLENE WITH TRIS-m-METHYL PHENOXY SYN-1,3,5-TRIAZINE AND A POLYAMIDE
Henry Moncure, Jr., Wilmington, Del., assignor to E. I. du Pont de Nemours and Company, Wilmington, Del., a corporation of Delaware
No Drawing. Filed Oct. 19, 1967, Ser. No. 676,625
Int. Cl. C08g 37/04, 51/60
U.S. Cl. 260—857
3 Claims

ABSTRACT OF THE DISCLOSURE

The melt stability of high molecular weight polyoxymethylenes is improved by the addition of selected superpolyamides, e.g. a terpolymer containing approximately 43.3% polycaprolactam, 33.6% polyhexamethylene adipamide and 23.1% polyhexamethylene sebacamide, and selected substituted triazines, e.g. tri tolyl cyanurate.

---

The present invention relates to the preparation of compositions of high molecular weight polyoxymethylenes with selected stabilizers to improve the melt stability of the polyoxymethylene. The "polyoxymethylene" as used herein means a polymer with sufficient molecular weight to be classed as a thermoplastic in which oxymethylene units comprise the polymer chain. Especially preferred are those polyoxymethylenes having ether groups (—OR) as terminal groups. Such polymers are described in United States Patent 3,192,182, issued on June 29, 1965 to N. Brown et al. The present compositions are prepared by intimate blending with the polyoxymethylene from 0.1 to 3% by weight based upon said polyoxymethyl of a superpolyamide and from 0.05 to 2% by weight based upon said polyoxymethylene of a triazine and, preferably, tri tolyl cyanurate. The superpolyamides employed in the present composition are described in United States Patent 2,993,025, issued to R. G. Alsup and P. E. Lindvig on July 18, 1961 having repeating carbonamide groups as integral parts of the linear polymeric chain. The preferred superpolyamide is a terpolymer having a number average molecular weight of about 20–25,000 containing 43.3% polycaprolactam, 33.6% polyhexamethylene adipamide and 23.1% polyhexamethylene sebacamide.

Any technique which assures itimate blending of the additives with the polyoxymethylene without degrading the components may be employed to prepare the present compositions. A convenient method is to mix a solution of the stabilizers in volatile organic solvent which is not a solvent for the polyoxymethylene with a powder of polyoxymethylene followed by evaporation of the solvent. As an alternative, the polymer and stabilizers can be mixed in the solid phase and homogenized by melt plasticating.

Other additives can be blended with stabilized compositions of this invention. Ultraviolet absorbers such as orthohydroxy benzophenones, cinnamonitriles and benzotriazoles may be present in addition to the stabilizers claimed. Antioxidants such as 2,2'-methylenebis(4-methyl-6-tertiary butyl phenol) may be added to the claimed composition at a concentration of 0.05 to 2% by weight based upon the polyoxymethylene.

The stabilized compositions of this invention are useful for conversion into films, sheets, fibers, filaments, bristles, molded articles and the like by melt extrusion, injection molding or other fabrication methods obvious to those skilled in the art.

The following examples are presented to illustrate but not to restrict the present invention. Parts and percentages are by weight unless otherwise noted.

The thermal stability of the melt in an inert atmosphere is reported as the gas index (GI) which test is described in United States Patent 3,081,280, issued to D. P. Carlson on Mar. 12, 1963. The numerical value of GI is 3.7 times the milliliters of gas evolved per gram of polymer per 15 minutes elapsed time at 231° C. during the interval of 5–20 minutes after the beginning of the test.

The color stability of the molten polymer is reported herein as a yellowness index (YI) which index is determined as follows: Approximately 10 grams of polymer in the form of molding cubes is charged to a standard melt indexer and held at 222° C. for 30 minutes. The polymer melts in the indexer and after the 30 minute time period, the molten polymer is forced out and collected in the cavity of a metal mold to produce a single disc of approximately 1 inch in diameter and ¼ inch in thickness. The mold is closed and a slight pressure applied to press the molten plastic in the cavity. The mold is then quenched in cold water and the color of the disc is measured. The measuring device is a Colormaster Differential Colorimeter Model 4, manufactured by the Manufacturers Engineering and Equipment Corporation. In the measurement, R is the reading of the red reflectance units, B is the blue reflectance units and G is the green reflectance units. The degree of yellowness is then calculated as the yellowness index (YI) according to the following equation:

$$YI = \frac{R-B}{G} \times 100$$

The lower the yellowness index, the less yellow and hence more white the sample.

EXAMPLES 1 AND 2

A high molecular weight polyoxymethylene homopolymer was prepared according to the general process of Example 7 of United States Patent 2,994,687, issued to H. H. Goodman and L. T. Sherwood on Aug. 1, 1961. The polymer was then alkylated according to the general procedure of Example 1 of United States Patent 3,192,182, issued to N. Brown and W. E. Grigsby on June 29, 1965. The resulting polyoxymethylene homopolymer was then contacted with superheated steam which has been passed over guanidine carbonate held at 170° C. The stability of the alkylated polymer after the steam treatment and subsequent extrusions as described below was measured and reported as Control 1 in Table I. The compositions were prepared by blending the indicated additives and then extruding the blend through a 2-inch diameter, single screw extruder with a melt temperature of 200–210° C. into a rod ¹⁄₁₆ to ⅛ inch in diameter which was subsequently cooled and cut into small cylinders approximately ⅛ inch long and dried in a vacuum over at 80° C. overnight. The cylinders were then heated to 120° C. for a period of four hours following which they were cooled to room temperature and the GI and YI were measured as described above.

The tri-m-tolyl cyanurate(tris-o-methyl phenoxysyn-1,3,5-triazine) was prepared according to the method of F. C. Schaefer, J. T. Thurston and J. R. Dudley as described in the Journal of the American Chemical Society, vol. 83, page 2992 by substituting 0.31 mol of m-cresol for the phenol described in the above-identified article. The crude product was recrystallized from toluene. The purified tri-m-tolyl cyanurate melted at 248° C. The superpolyamide employed was a terpolymer containing by weight approximately 43.3% polycaprolactam, 33.6% polyhexamethylene adipamide and 23.1% polyhexamethylene sebacamide. The antioxidant employed in Control 3 and Example 2 was 2,2'-methylenebis(4-methyl-6-tertiary butyl phenol).

It may be seen from the foregoing examples that the additives of the present invention provide a composition which is quite stable in the molten state. It can be noted that the control compositions which contain superpolyamide and the superpolyamide in combination with antioxidant increase in yellowness upon hold-up in the molten state. The additives of the present invention reduce the yellowness. It should be noted that although the yellowness index is somewhat improved by the use of melamine, a known stabilizer (Comparison A), the thermal stability is inferior to that obtained by the use of the compound of the present invention.

Comparison B is a composition of the same polymer as Example 1 but containing triphenyl cyanurate, an additive of similar structure to that employed in the composition of the present invention. This composition is less thermally stable. Controls 1, 2 and 3 show the thermal stability of the present invention in the absence of the additive combination claimed herein.

TABLE I

| Additives | Compositions | GI | YI |
|---|---|---|---|
| Control 1 | None | 28 | 3 |
| Control 2 | 0.5% superpolyamide | 10 | 18 |
| Control 3 | 0.5% superpolyamide, 0.2% antioxidant | 9 | 21 |
| Example 1 | 1.0% superpolyamide, 0.2% tri tolyl cyanurate | 8 | 7 |
| Example 2 | 0.5% superpolyamide, 0.2% tri tolyl cyanurate, 0.2% antioxidant | 10 | 7 |
| Comparison A | 0.5% superpolyamide, 0.2% melamine | 14 | 2 |
| Comparison B | 0.5% superpolyamide, 0.2% triphenyl cyanurate | 28 | 8 |

I claim:

1. A thermoplastic composition having improved melt stability which comprises a normally solid, high molecular weight polyoxymethylene and from about 0.05 to 2.0 percent by weight based upon said polyoxymethylene of tris-m-methyl phenoxysyn-1,3,5-triazine, and from 0.1 to 3 percent by weight based upon said polyoxymethylene of superpolyamide having repeating carbonamide groups as integral portions of the linear polymeric chain, said composition being characterized by the fact that the composition in the melt phase exhibits a high degree of color stability and thermal stability compared to a polyoxymethylene in the absence of said cyanurate and said superpolyamide.

2. The composition in claim 1 containing 0.05 to 2 percent by weight based upon said polyoxymethylene of an antioxidant.

3. The composition of claim 1 wherein said superpolyamide is a terpolymer consisting of 44.3% polycaprolactam, 33.6% polyhexamethylene adipamide and 23.1% polyhexamethylene sebacamide.

References Cited

UNITED STATES PATENTS 3,397,205   8/1968   Luethi _____ 260—45.8

MURRAY TILLMAN, Primary Examiner

P. LIEBERMAN, Assistant Examiner

U.S. Cl. X.R.

260—45.8, 45.9, 45.95, 67, 78